(12) United States Patent
Zhang

(10) Patent No.: US 11,189,287 B2
(45) Date of Patent: Nov. 30, 2021

(54) OPTIMIZATION METHOD, APPARATUS, DEVICE FOR WAKE-UP MODEL, AND STORAGE MEDIUM

(71) Applicant: BAIDU ONLINE NETWORK TECHNOLOGY (BEIJING) CO., LTD., Beijing (CN)

(72) Inventor: Yongchao Zhang, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 137 days.

(21) Appl. No.: 16/703,596

(22) Filed: Dec. 4, 2019

(65) Prior Publication Data

US 2020/0411000 A1 Dec. 31, 2020

(30) Foreign Application Priority Data

Jun. 27, 2019 (CN) .......................... 201910569405.X

(51) Int. Cl.
*G10L 15/22* (2006.01)
*G10L 15/06* (2013.01)
(Continued)

(52) U.S. Cl.
CPC ............ *G10L 15/22* (2013.01); *G10L 15/063* (2013.01); *G10L 15/14* (2013.01); *G10L 15/16* (2013.01); *G10L 2015/223* (2013.01)

(58) Field of Classification Search
CPC ....... G10L 15/22; G10L 15/063; G10L 15/14; G10L 15/16; G10L 2015/223
See application file for complete search history.

(56) References Cited

U.S. PATENT DOCUMENTS 9,275,637 B1 * 3/2016 Salvador ................. G10L 15/06
9,922,364 B1 * 3/2018 Chen .................. G06Q 30/0635
(Continued)

FOREIGN PATENT DOCUMENTS

CN 101393740 A1 3/2009
CN 107221326 A 9/2017
(Continued)

OTHER PUBLICATIONS

The first Office Action of parallel JP application.
(Continued)

*Primary Examiner* — Michael Colucci
(74) *Attorney, Agent, or Firm* — J.C. Patents

(57) ABSTRACT

Provided are an optimization method, apparatus, device for a wake-up model and a storage medium, which allow for: acquiring a training set and a verification set; performing an iterative training on the wake-up model according to the training set and the verification set; during the iterative training, periodically updating the training set and the verification set according to the wake-up model and a preset corpus database, and continuing performing the iterative training on the wake-up model according to the updated training set and verification set; and outputting the wake-up model when a preset termination condition is reached. The embodiments of the present disclosure, by periodically updating the training set and the verification set according to the wake-up model and the preset corpus database during an iteration, may improve optimization efficiency and effects of the wake-up model, thereby improving stability and adaptability of the wake-up model and avoiding overfitting.

15 Claims, 5 Drawing Sheets

(51) Int. Cl.
*G10L 15/14* (2006.01)
*G10L 15/16* (2006.01)

(56) References Cited

U.S. PATENT DOCUMENTS

| | | | |
|---|---|---|---|
| 10,210,860 B1 | 2/2019 | Ward | |
| 10,692,489 B1* | 6/2020 | Grizzel | G10L 15/18 |
| 10,867,602 B2* | 12/2020 | Yuan | G10L 15/04 |
| 2009/0198493 A1 | 8/2009 | Zeynep | |
| 2015/0019214 A1 | 1/2015 | Wang | |
| 2015/0154953 A1* | 6/2015 | Bapat | G10L 15/06 |
| | | | 704/251 |
| 2018/0158449 A1* | 6/2018 | Tang | G10L 13/04 |
| 2019/0043481 A1* | 2/2019 | Georges | G10L 15/063 |
| 2019/0221205 A1* | 7/2019 | Czyryba | G10L 15/08 |
| 2019/0287526 A1* | 9/2019 | Ren | G10L 15/18 |
| 2021/0118439 A1* | 4/2021 | Schillmoeller | G06F 3/04842 |

FOREIGN PATENT DOCUMENTS

| | | |
|---|---|---|
| CN | 107358951 A | 11/2017 |
| CN | 108564954 A | 9/2018 |
| CN | 108766420 A | 11/2018 |
| CN | 108898222 A | 11/2018 |
| CN | 109243446 A | 1/2019 |
| CN | 109886386 A | 6/2019 |
| WO | WO9320552 A1 | 10/1993 |
| WO | WO2019001428 A1 | 1/2019 |

OTHER PUBLICATIONS

"A relative-entropy-based sentence selection approach for acoustic model training", Tokyo Institute of Technology.

The first Office Action of priority CN application.

NPL1: "Hellonpu: A corpus for small-footprint wake-up word detection research", National Conference on Man-Machine Speech Communication, Feb. 3, 2018.

NPL2: "Research on Chinese Spoken Term Detection Based on Deep Learning", By Wang Zhaosong, Dissertation for the Master Degree in Engineering, Harbin Institute of Technology, Feb. 15, 2016.

* cited by examiner

OPTIMIZATION METHOD, APPARATUS, DEVICE FOR WAKE-UP MODEL, AND STORAGE MEDIUM

CROSS-REFERENCE TO RELATED APPLICATION

This application claims priority to Chinese Patent Application No. 201910569405.X, filed on Jun. 27, 2019, which is hereby incorporated by reference in its entirety.

TECHNICAL FIELD

The present disclosure relates to the field of communication technologies and, in particular, to an optimization method, apparatus, device for a wake-up model, and a storage medium.

BACKGROUND

With rapid popularization of smart mobile devices, voice, a natural and convenient way for humans, has become increasingly hot in human-computer interaction. At present, smart devices with voice interaction functions are emerging one after another, such as mobile phone voice assistants, smart speakers, voice chabots, and voice-controlled TVs, and thus Internet companies and innovative companies flood into the hot market. According to user feedback and user research, voice interaction does improve convenience for users.

As a significant component of voice-related technology, Hotword Detection technology is ranked at the first place of the whole voice interaction, which plays an important role in overall interaction satisfaction. A wake-up system has two key indicators: wake-up rate and false wake-up, where the wake-up rate should be as high as possible, and meanwhile the false wake-up should cover as few as possible. However, for one wake-up system, these two indicators are like a seesaw—pursuit of a high wake-up rate may easily trigger more false wake-ups. For example, some smart rearview mirrors in the market often trigger false wake-ups when users are chatting with each other in a car, not only affecting other users in the car but also distracting the driver's attention, so that user experience is greatly impaired. It is an important session to improve user experience in aspects of how to ensure both a high wake-up rate and a slash of false wake-ups.

In the prior art, the Hotword Detection technology has evolved from an original template matching-based detection technology to a current modeling scheme for a neural network-based acoustic model. The Hotword Detection technology has become matured gradually, and meanwhile requirements for wake-up performance also become strict. Among others, a modeling scheme for a neural network-based hotword substantially lies in: acquiring a training set and a verification set, performing, according to the training set and the verification set, multiple rounds of iterative trainings to obtain a wake-up model, then performing model optimization, and optimizing the wake-up model through a pre-collected tuning set. However, due to a limited amount of data for false wake-ups in the tuning set, the overall optimization phase is less-effective; in addition, as the wake-up model is optimized, benefits from the pre-collected tuning set decline extremely, resulting in poor optimization efficiency and effects of the wake-up model and affecting stability of the model.

SUMMARY

Embodiments of the present disclosure provide an optimization method, apparatus, device for a wake-up model and a storage medium, targeting at improving optimization efficiency and effects of the wake-up model, thereby improving stability and adaptability of the wake-up model and avoiding overfitting.

In a first aspect, an embodiment of the present disclosure provides an optimization method for a wake-up model, including:

acquiring a training set and a verification set;

performing an iterative training on the wake-up model according to the training set and the verification set;

during the iterative training, periodically updating the training set and the verification set according to the wake-up model and a preset corpus database, and continuing performing the iterative training on the wake-up model according to the updated training set and verification set; and outputting the wake-up model when a preset termination condition is reached.

In a second aspect, an embodiment of the present disclosure provides an optimization apparatus for a wake-up model, including:

an acquiring module, configured to acquire a training set and a verification set;

a training module, configured to perform an iterative training on the wake-up model according to the training set and the verification set;

a tuning module, configured to during the iterative training, periodically update the training set and the verification set according to the wake-up model and a preset corpus database;

where the training module is further configured to continue performing the iterative training on the wake-up model according to the updated training set and verification set; and an outputting module, configured to output the wake-up model when a preset termination condition is reached.

In a third aspect, an embodiment of the present disclosure provides an optimization device for a wake-up model, including:

a memory a processor; and a computer program;

where the computer program is stored on the memory, and is configured to be executable by the processor to implement the method as described in the first aspect.

In a fourth aspect, an embodiment of the present disclosure provides a computer readable storage medium having stored thereon a computer program;

where the computer program, when being executed by a processor, implements the method as described in the first aspect.

The optimization method, apparatus, device for the wake-up model and the storage medium according to the embodiments of the present disclosure allow for: acquiring a training set and a verification set; performing an iterative training on the wake-up model according to the training set and the verification set; during the iterative training, periodically updating the training set and the verification set according to the wake-up model and a preset corpus database, and continuing performing the iterative training on the wake-up model according to the updated training set and verification set; and outputting the wake-up model when a preset termination condition is reached. The embodiments of the present disclosure, by periodically updating the training set and the verification set according to the wake-up model and the preset corpus database during an iteration, may improve optimization efficiency and effects of the wake-up model, thereby improving stability and adaptability of the wake-up model and avoiding over-fitting.

BRIEF DESCRIPTION OF DRAWING(S)

In order to describe technical solutions in embodiments of the present disclosure or the prior art more clearly, accompanying drawings used in the description of the embodiments or the prior art will be briefly described hereunder. Obviously, the described drawings are merely some embodiments of present disclosure. For persons of ordinary skill in the art, other drawings may be obtained based on these drawings without any creative effort.

DESCRIPTION OF EMBODIMENTS

The technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
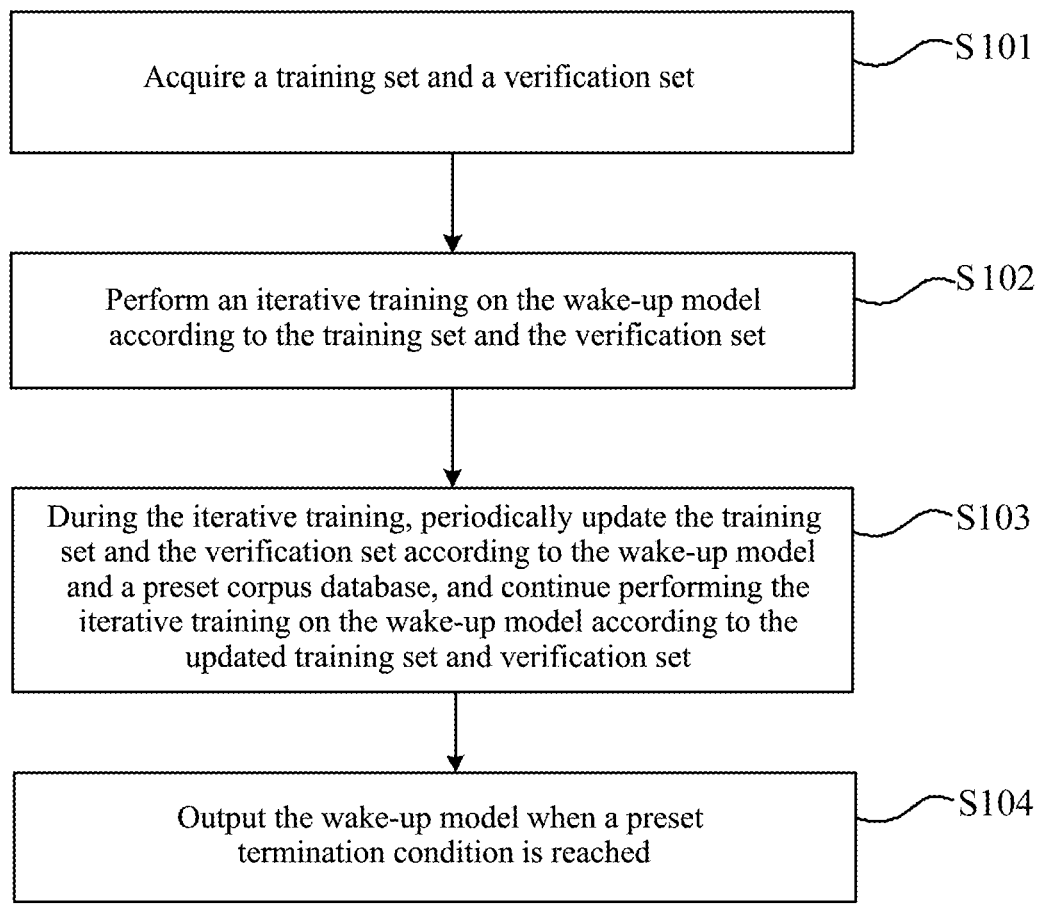
FIG. 1 is a flowchart of an optimization method for a wake-up model according to an embodiment of the present disclosure.

FIG. 1 is a flowchart of an optimization method for a wake-up model according to an embodiment of the present disclosure. This embodiment provides an optimization method for a wake-up model, and specific steps of the method are as follows:

S101, acquire a training set and a verification set.

In this embodiment, the training set is voice data for training the wake-up model, and the verification set is voice data for verifying the trained wake-up model and performing a preliminary evaluation on capability of the wake-up model. Specifically, positive example data and negative example data may be acquired first, and then the positive example data and the negative example data are divided into the training set and the verification set. Certainly, a test set may also be included in this embodiment, and details will not be described herein again.

Figure 2:
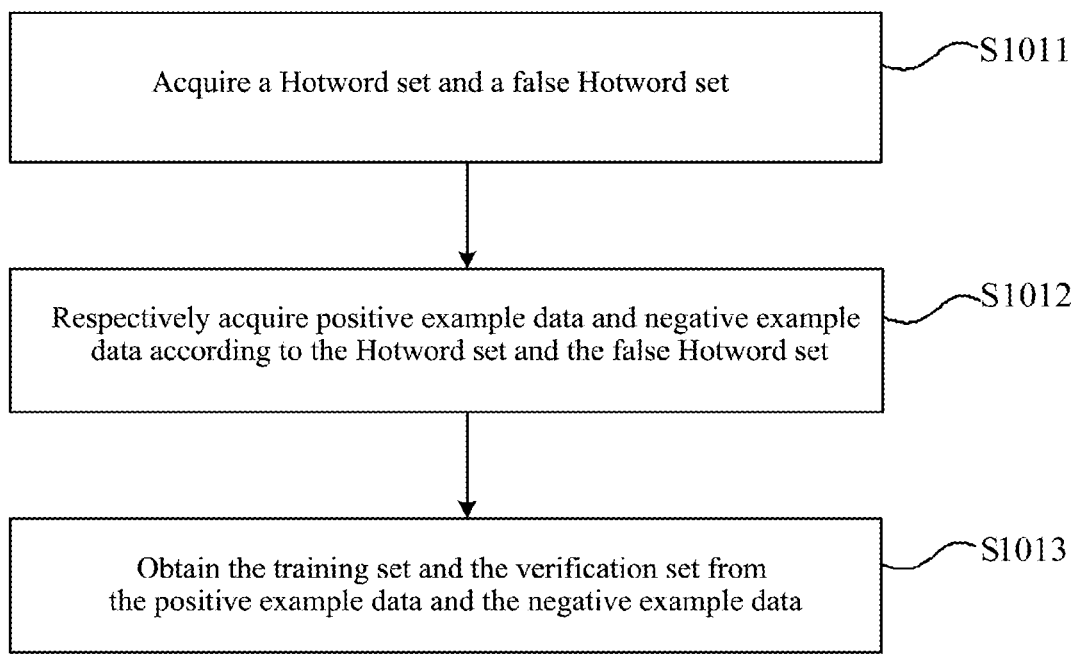
FIG. 2 is a flowchart of an optimization method for a wake-up model according to another embodiment of the present disclosure.

More specifically, as shown in FIG. 2, the acquiring a training set and a verification set as described in this embodiment may specifically include:

S1011, acquire a Hotword set and a false Hotword set;

S1012, respectively acquire positive example data and negative example data according to the Hotword set and the false Hotword set; and S1013, obtain the training set and the verification set from the positive example data and the negative example data.

In this embodiment, firstly, the Hotword set and the false Hotword set are acquired first, where the Hotword set includes voice data with Hotwords, and the false Hotword set includes voice data with false Hotwords, hence, the data in the Hotword set may be directly used as the positive example data, and the data in the false Hotword set is directly used as the negative example data. Certainly, the data in the Hotword set and the false Hotword set may also performed with predetermined processing to obtain the positive example data and the negative example data, such as a data enhancement operation on the data. For example, superimposing preset noise data and/or reverberation data onto the data in the Hotword set and the false Hotword set, and/or adjusting a playback rate of a target data, in order to simulate a vocal situation in a real-world scenario. After the positive example data and the negative example data are acquired, they may be mixed and divided into a training set and a verification set according to a predetermined proportion, and a random division may be used in the dividing process.

S102, perform an iterative training on the wake-up model according to the training set and the verification set.

In this embodiment, the wake-up model may be a neural network model which may be performed with the iterative training through the training set and the verification set. For a specific iterative training process, an iterative training method commonly used in the field may be used, and details will not be described herein again.

S103, during the iterative training, periodically update the training set and the verification set according to the wake-up model and a preset corpus database, and continue performing the iterative training on the wake-up model according to the updated training set and verification set.

In this embodiment, during a process where the wake-up model is performed with the iterative training, the training set and the verification set may be periodically updated to achieve tuning of the training set and the verification set, and the wake-up module is proceeded with the iterative training according to the updated training set and verification set, then stability and adaptability of the model may be improved and over-fitting is avoided. In this embodiment, a large-scale corpus database (such as music, TV series, news, a corpus database for chat, and other noise sets) may be selected as the preset corpus database, and a certain number of corpora (voice data) is screened from the preset corpus database according to the current wake-up model to update the training set and the verification set. Further, since Hotwords are fixed and unchanged in a normal situation, in this embodiment, only a predetermined number of corpora that generate false wake-ups may be screened from the preset corpus database according to the current wake-up model to update the negative example data in the training set and the verification set.

S104, output the wake-up model when a preset termination condition is reached.

In this embodiment, the preset termination condition may lie in terminating the iterative training when the number of iterative trainings reaches a preset number or accuracy of the wake-up model reaches a preset threshold, and then the wake-up model may be output.

The optimization method for the wake-up model provided in this embodiment allows for: acquiring a training set and a verification set; performing an iterative training on the wake-up model according to the training set and the verification set; during the iterative training, periodically updating the training set and the verification set according to the wake-up model and a preset corpus database, and continuing performing the iterative training on the wake-up model according to the updated training set and verification set; and outputting the wake-up model when a preset termination condition is reached. The embodiment, by periodically updating the training set and the verification set according to the wake-up model and the preset corpus database during an iteration, may improve optimization efficiency and effects of the wake-up model, thereby improving stability and adaptability of the wake-up model and avoiding overfitting.

Figure 3:
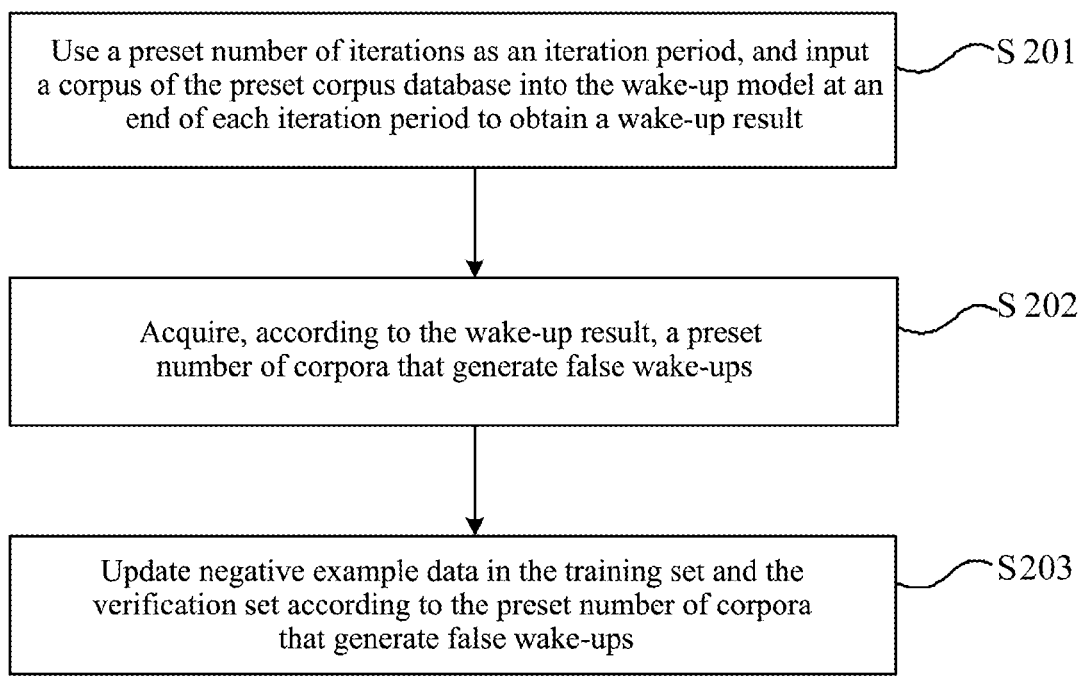
FIG. 3 is a flowchart of an optimization method for a wake-up model according to another embodiment of the present disclosure.

On the basis of the foregoing embodiments, as shown in FIG. 3, the periodically updating the training set and the verification set according to the wake-up model and a preset corpus database described in S103 may specifically include:

S201, use a preset number of iterations as an iteration period, and input a corpus of the preset corpus database into the wake-up model at an end of each iteration period to obtain a wake-up result;

S202, acquire, according to the wake-up result, a preset number of corpora that generate false wake-ups; and S203, update negative example data in the training set and the verification set according to the preset number of corpora that generate false wake-ups.

In this embodiment, a preset number of iterations may be used as an iteration period. For example, if the preset number of iterations is T, a current number of iterations i is recorded, when i reaches an integer multiple of T, that is, the current iteration period ends, a corpus of the preset corpus database is input into the current wake-up model to obtain a wake-up result. The wake-up result includes situations of wake-up success and wake-up failure, while the wake-up success situation includes a wake-up by Hotwords and a false wake-up. In this embodiment, the corpora that generate false wake-ups are selected to update the negative example data in the training set and the verification set. Specifically, corpora for successful wake-ups may be firstly screened, and then corpora of non-Hotwords are screened from the corpora for the successful wake-ups as the corpora for false wake-ups; certainly, other measures may be used to obtain the corpora that generate false wake-ups. Since the screening of the corpora that generate false wake-ups is screening performed according to the current wake-up model, results obtained from the screening are more targeted, and the wake-up model may be better optimized during a next iterative training, so that adaptability and stability of the wake-up model are improved. In this embodiment, since the positive example data and the negative example data have a fixed proportion, and the number of the positive example data may remain unchanged, it is necessary to acquire an appropriate number (that is, the preset number) of corpora that generate false wake-ups, so that the updated positive example data and negative example data still remain an unchanged proportion.

Figure 4:
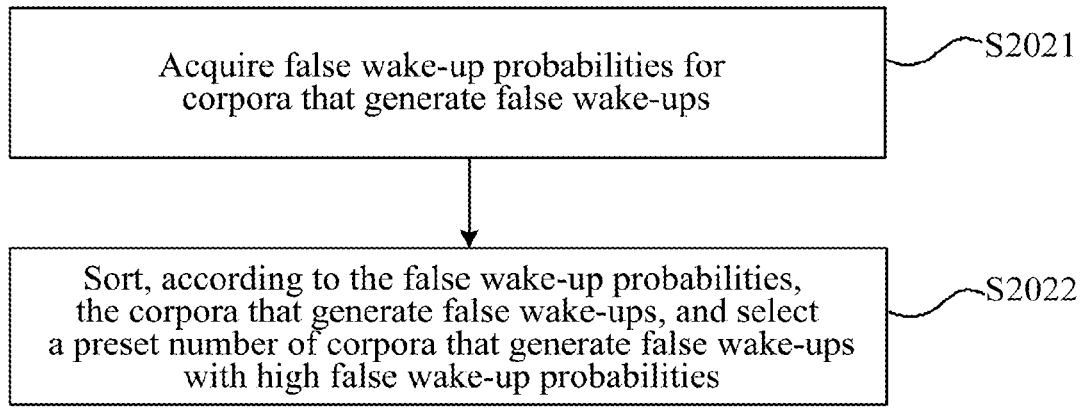
FIG. 4 is a flowchart of an optimization method for a wake-up model according to another embodiment of the present disclosure.

On the basis of the foregoing embodiments, as shown in FIG. 4, the acquiring, according to the wake-up result, a preset number of corpora that generate false wake-ups as described in S202 includes:

S2021, acquire false wake-up probabilities for corpora that generate false wake-ups; and S2022, sort, according to the false wake-up probabilities, the corpora that generate false wake-ups, and select a preset number of corpora that generate false wake-ups with high false wake-up probabilities.

In this embodiment, in screening the corpora that generate false wake-ups, a corpus which is most likely to generate a false wake-up may be selected therefrom, in particular, by acquiring a false wake-up probability for each corpus that generates a false wake-up, and then selecting a preset number of corpora that generate false wake-ups with high false wake-up probabilities, targeted of the wake-up model may be further improved, and optimization effects on the wake-up model are improved.

Further, the updating negative example data in the training set and the verification set according to the preset number of corpora that generate false wake-ups as described in S203 in the foregoing embodiment may specifically include:

update the negative example data in the training set and the verification set after a data enhancement operation is performed on the preset number of corpora that generate false wake-ups.

In the foregoing embodiment, since the positive example data and the negative example data in the training set and the verification set may be data subjected to the data enhancement operation, in order to maintain that the updated training set and verification set have a data structure consistent with that prior to the updating, the data enhancement operation may be performed on the obtained preset number of corpora that generate false wake-ups, and then the negative example data in the training set and the verification set is updated. For the data enhancement operation, preset noise data and/or reverberation data may be superimposed onto corpus data that generates false wake-ups, and/or a playback rate is adjusted for the corpora that generate false wake-ups.

On the basis of any of the foregoing embodiments, the data enhancement operation is described detailedly in this embodiment. The data enhancement operation may specifically include:

superimpose preset noise data and/or reverberation data onto target data to be performed with the data enhancement operation; and/or adjust a playback rate of the target data.

In this embodiment, the preset noise data may include noise data in different environments, such as noise in a public place, indoor noise, ambient noise in different weathers, and the like. When the preset noise data is superimposed onto the target data, the superimposing may also be performed at different signal-to-noise ratios, so that target data in different noise environments may be simulated. The preset reverberation data may include different reverberation parameter values, so that target data in different spaces is simulated. In addition, the playback rate of the target data may also be adjusted. Certainly, the data enhancement operation may be not limited to the above three types, and other operations capable of adjusting acoustic characteristics of the target data may also be performed. In this embodiment, at least one of the data enhancement operations described above may be used to enhance the target data, so that simulation of vocal voice in different real-world scenarios may be achieved, therefore, adaptability and stability of the wake-up model in different real-world scenarios may be improved.

Figure 5:
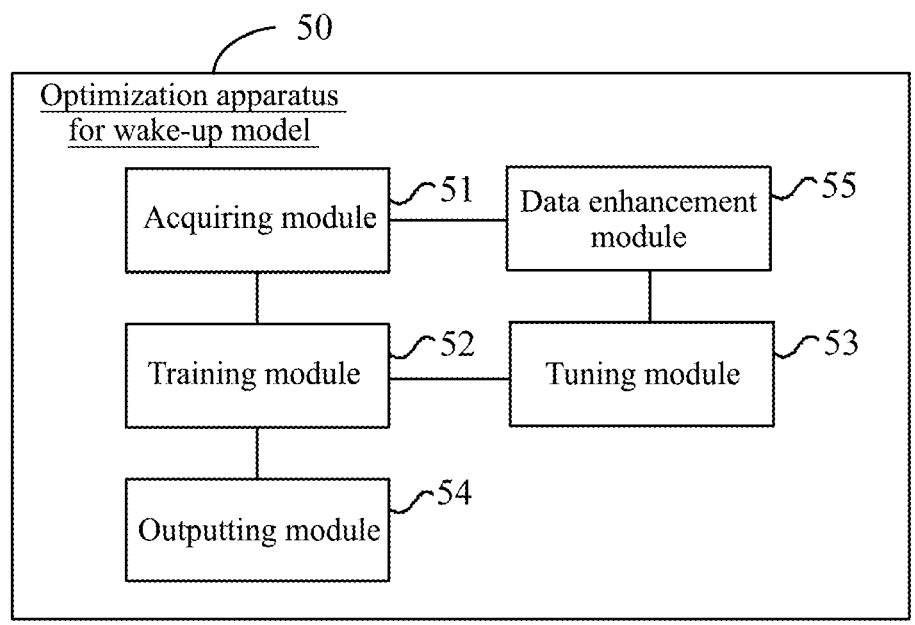
FIG. 5 is a structural diagram of an optimization apparatus for a wake-up model according to an embodiment of the present disclosure.

FIG. 5 is a structural diagram of an optimization apparatus for a wake-up model according to an embodiment of the present disclosure. The optimization apparatus for the wake-up model provided in this embodiment may perform process flows provided in the embodiment of the optimization method for the wake-up model. As shown in FIG. 5, the optimization apparatus for the wake-up model includes an acquiring module 51, a training module 52, a tuning module 53, and an outputting module 54.

Among them, the acquiring module 51 is configured to acquire a training set and a verification set;

the training module 52 is configured to perform an iterative training on the wake-up model according to the training set and the verification set;

the tuning module 53 is configured to during the iterative training, periodically update the training set and the verification set according to the wake-up model and a preset corpus database;

the training module 52 is further configured to continue performing the iterative training on the wake-up model according to the updated training set and verification set; and the outputting module 54 is configured to output the wake-up model when a preset termination condition is reached.

On the basis of the forgoing embodiment, the tuning module 53 is configured to:

use a preset number of iterations as an iteration period, and input a corpus of the preset corpus database into the wake-up model at an end of each iteration period to obtain a wake-up result;

acquire, according to the wake-up result, a preset number of corpora that generate false wake-ups; and update negative example data in the training set and the verification set according to the preset number of corpora that generate false wake-ups.

On the basis of any one of the forgoing embodiments, the tuning module 53 is configured to:

acquire false wake-up probabilities for corpora that generate false wake-ups; and sort, according to the false wake-up probabilities, the corpora that generate false wake-ups, and select a preset number of corpora that generate false wake-ups with high false wake-up probabilities.

On the basis of any one of the forgoing embodiments, the acquiring module 51 is configured to:

acquire a Hotword set and a false Hotword set;

respectively acquire positive example data and negative example data according to the Hotword set and the false Hotword set; and obtain the training set and the verification set from the positive example data and the negative example data.

On the basis of any one of the forgoing embodiments, the apparatus 50 further includes a data enhancement module 55, configured to:

be invoked by the acquiring module 51 to perform a data enhancement operation on data in the Hotword set and the false Hotword set, and obtain the positive example data and the negative example data.

On the basis of any one of the forgoing embodiments, the data enhancement module 55 is further configured to:

be invoked by the tuning module 53 to update the negative example data in the training set and the verification set after a data enhancement operation is performed on the preset number of corpora that generate false wake-ups.

On the basis of any one of the forgoing embodiments, the data enhancement module 55 is configured to:

superimpose preset noise data and/or reverberation data onto target data to be performed with the data enhancement operation; and/or adjust a playback rate of the target data.

The optimization apparatus for the wake-up model according to the embodiment of the present disclosure may be specifically used to perform the foregoing method embodiments provided in the FIGS. 1-4, and the specific functions are not described herein again.

The optimization apparatus for the wake-up model provided in the embodiment of the present disclosure allows for: acquiring a training set and a verification set; performing an iterative training on the wake-up model according to the training set and the verification set; during the iterative training, periodically updating the training set and the verification set according to the wake-up model and a preset corpus database, and continuing performing the iterative training on the wake-up model according to the updated training set and verification set; and outputting the wake-up model when a preset termination condition is reached. The embodiment of the present disclosure, by periodically updating the training set and the verification set according to the wake-up model and the preset corpus database during an iteration, may improve optimization efficiency and effects of the wake-up model, thereby improving stability and adaptability of the wake-up model and avoiding overfitting.

Figure 6:
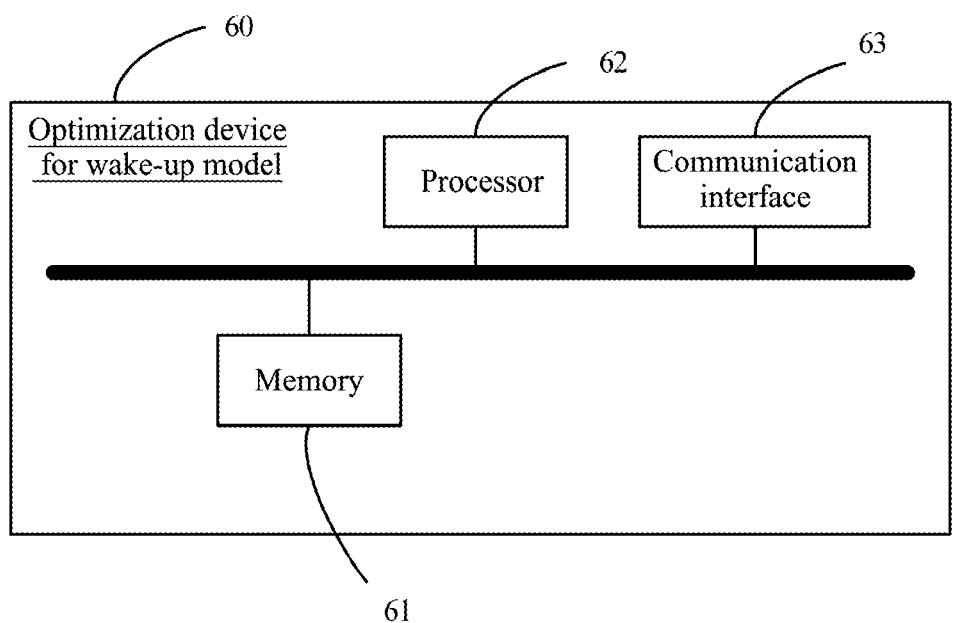
FIG. 6 is a structural diagram of an optimization device for a wake-up model according to an embodiment of the present disclosure.

FIG. 6 is a structural diagram of an optimization device for a wake-up model according to an embodiment of the present disclosure. The optimization device for the wake-up model provided in the embodiment of the present disclosure may perform process flows provided in the embodiment of the optimization method for the wake-up model. As shown in FIG. 6, the optimization device for the wake-up model 60 includes a memory 61, a processor 62, a computer program, and a communication interface 63; where the computer program is stored on the memory 61, and is configured to be executed by the processor 62 to implement the optimization method for the wake-up module as described in the above embodiment.

The optimization device for the wake-up model in the embodiment shown in FIG. 6 may be used to implement the technical solutions in the foregoing method embodiment; implementation principles and technical effects therebetween are similar, and details will not be described herein again.

In addition, an embodiment further provides a computer readable storage medium having stored thereon a computer program, where the computer program is executed by a processor to implement the optimization method for the wake-up module as described in the above embodiment.

In several embodiments provided in the present disclosure, it will be appreciated that the disclosed apparatus and method may be implemented in other manners. For example, the described apparatus embodiments are merely exemplary. For example, the division of the units is merely a division of logical functions and there may be other divisions during actual implementations. For example, a plurality of units or components may be combined or integrated into another system, or some features may be omitted or not performed. In addition, the presented or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts shown as units may or may not be physical units, that is, may be located in one position, or may be distributed on a plurality of network units. A part or all of the units may be selected according to actual needs to achieve the objectives of the scheme in the embodiments.

In addition, functional units in the embodiments of the present disclosure may be integrated into one processing unit, or each of the units may exist alone physically, or two or more units are integrated into one unit. The above integrated unit may be implemented in a form of hardware or in a form of hardware plus software functional units.

The integrated unit implemented in the form of software functional unit as described above may be stored in a computer readable storage medium. The above software functional unit is stored in a storage medium, and includes several instructions for enabling a computer device (which may be a personal computer, a server, or a network device, etc.) or a processor to perform a part of steps of the method described in the embodiments of the present disclosure. The foregoing storage medium includes: any medium that can be stored with program codes, such as a USB flash disk, a mobile hard disk, a Read-Only Memory (ROM), a Random Access Memory (RAM), a magnetic disk, or an optical disc, etc.

It may be clearly understood by persons skilled in the art that, for the purpose of convenient and brief description, the division of the described functional modules is merely described for illustrations, in practical use, the described functions may be assigned as desired to different functional modules for implementations, that is, the internal structure of the apparatus is divided into different functional modules to implement all or a part of functions as described above. For a detailed working process of the described apparatus, reference may be made to corresponding processes in the foregoing method embodiment, and details will not be described herein.

Finally, it should be noted that the foregoing embodiments are merely intended for describing the technical solutions of the present disclosure other than limiting the present disclosure. Although the present disclosure has been described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions of the embodiments of the present disclosure.

What is claimed is:

1. An optimization method for a wake-up model, comprising:
    acquiring a training set and a verification set;
    performing an iterative training on the wake-up model according to the training set and the verification set;
    during the iterative training, periodically updating the training set and the verification set according to the wake-up model and a preset corpus database, and continuing performing the iterative training on the wake-up model according to the updated training set and verification set; and
    outputting the wake-up model when a preset termination condition is reached;
    wherein the periodically updating the training set and the verification set according to the wake-up model and a preset corpus database comprises:
    using a preset number of iterations as an iteration period, and inputting a corpus of the preset corpus database into the wake-up model at an end of each iteration period to obtain a wake-up result;
    acquiring, according to the wake-up result, a preset number of corpora that generate false wake-ups; and
    updating negative example data in the training set and the verification set according to the preset number of corpora that generate false wake-ups.

2. The method according to claim 1, wherein the acquiring, according to the wake-up result, a preset number of corpora that generate false wake-ups comprises:
    acquiring false wake-up probabilities for corpora that generate false wake-ups; and
    sorting, according to the false wake-up probabilities, the corpora that generate false wake-ups, and selecting a preset number of corpora that generate false wake-ups with high false wake-up probabilities.

3. The method according to claim 1, wherein the acquiring a training set and a verification set comprises:
    acquiring a Hotword set and a false Hotword set;
    respectively acquiring positive example data and negative example data according to the Hotword set and the false Hotword set; and
    obtaining the training set and the verification set from the positive example data and the negative example data.

4. The method according to claim 3, wherein the respectively acquiring positive example data and negative example data according to the Hotword set and the false Hotword set comprises:
    performing a data enhancement operation on data in the Hotword set and the false Hotword set, and obtaining the positive example data and the negative example data.

5. The method according to claim 1, wherein the updating negative example data in the training set and the verification set according to the preset number of corpora that generate false wake-ups comprises:
    updating the negative example data in the training set and the verification set after a data enhancement operation is performed on the preset number of corpora that generate false wake-ups.

6. The method according to claim 4, wherein the data enhancement operation comprises:
    superimposing preset noise data and/or reverberation data onto target data to be performed with the data enhancement operation; and/or
    adjusting a playback rate of the target data.

7. The method according to claim 5, wherein the data enhancement operation comprises:
    superimposing preset noise data and/or reverberation data onto target data to be performed with the data enhancement operation; and/or
    adjusting a playback rate of the target data.

8. An optimization apparatus for a wake-up model, comprising:
    a memory, a processor, and a computer program stored on the memory and executable by the processor,
    wherein the processor, when running the computer program, is configured to:
    acquire a training set and a verification set;
    perform an iterative training on the wake-up model according to the training set and the verification set;
    during the iterative training, periodically update the training set and the verification set according to the wake-up model and a preset corpus database;
    continue performing the iterative training on the wake-up model according to the updated training set and verification set; and
    output the wake-up model when a preset termination condition is reached;

wherein the processor is further configured to:

use a preset number of iterations as an iteration period, and input a corpus of the preset corpus database into the wake-up model at an end of each iteration period to obtain a wake-up result;

acquire, according to the wake-up result, a preset number of corpora that generate false wake-ups; and update negative example data in the training set and the verification set according to the preset number of corpora that generate false wake-ups.

9. The apparatus according to claim 8, wherein the processor is further configured to:

acquire false wake-up probabilities for corpora that generate false wake-ups; and sort, according to the false wake-up probabilities, the corpora that generate false wake-ups, and select a preset number of corpora that generate false wake-ups with high false wake-up probabilities.

10. The apparatus according to claim 8, wherein the processor is further configured to:

acquire a Hotword set and a false Hotword set;

respectively acquire positive example data and negative example data according to the Hotword set and the false Hotword set; and obtain the training set and the verification set from the positive example data and the negative example data.

11. The apparatus according to claim 10, wherein the processor is further configured to:

perform a data enhancement operation on data in the Hotword set and the false Hotword set, and obtain the positive example data and the negative example data.

12. The apparatus according to claim 8, wherein the processor is further configured to:

update the negative example data in the training set and the verification set after a data enhancement operation is performed on the preset number of corpora that generate false wake-ups.

13. The apparatus according to claim 11, wherein the processor is further configured to:

superimpose preset noise data and/or reverberation data onto target data to be performed with the data enhancement operation; and/or adjust a playback rate of the target data.

14. The apparatus according to claim 12, wherein the processor is further configured to:

superimpose preset noise data and/or reverberation data onto target data to be performed with the data enhancement operation; and/or adjust a playback rate of the target data.

15. A computer readable storage medium having stored thereon a computer program;

wherein the computer program, when being executed by a processor, implements the method according to claim 1.

* * * * *